US012759143B2

(12) United States Patent
Rácz et al.

(10) Patent No.: US 12,759,143 B2
(45) Date of Patent: Oct. 13, 2026

(54) TECHNIQUE FOR WIRELESSLY CONTROLLING A ROBOTIC DEVICE

(71) Applicant: Telefonaktiebolaget LM Ericsson (publ), Stockholm (SE)

(72) Inventors: Sándor Rácz, Cegléd (HU); Norbert Reider, Tényö (HU); Geza Szabo, Kecskemet (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1197 days.

(21) Appl. No.: 16/972,452

(22) PCT Filed: Jun. 4, 2018

(86) PCT No.: PCT/EP2018/064624

§ 371 (c)(1),
(2) Date: Dec. 4, 2020

(87) PCT Pub. No.: WO2019/233545

PCT Pub. Date: Dec. 12, 2019

(65) Prior Publication Data

US 2021/0229272 A1 Jul. 29, 2021

(51) Int. Cl.
*B25J 9/16* (2006.01)
*B25J 13/00* (2006.01)
*G05B 19/418* (2006.01)

(52) U.S. Cl.
CPC .......... *B25J 9/1602* (2013.01); *B25J 9/1676* (2013.01); *B25J 13/006* (2013.01); (Continued)

(58) Field of Classification Search
CPC ...... B25J 9/1602; B25J 13/006; B25J 9/1676; G05B 2219/31076; G05B 2219/33149; Y02P 90/02
See application file for complete search history.

(56) References Cited

U.S. PATENT DOCUMENTS 8,406,926 B1 3/2013 Lewis
9,682,481 B2 6/2017 Lutz et al.
(Continued)

FOREIGN PATENT DOCUMENTS

CN 105759815 A 7/2016
CN 206883638 U 1/2018
CN 107870610 A 4/2018

OTHER PUBLICATIONS

International Search Report and the Written Opinion of the International Searching Authority, issued in corresponding International Application No. PCT/EP2018/064624, dated Feb. 20, 2019, 13 pages.

*Primary Examiner* — Wade Miles
*Assistant Examiner* — Mohammed Yousef Abuelhawa
(74) *Attorney, Agent, or Firm* — Rothwell, Figg, Ernst & Manbeck, P.C.

(57) ABSTRACT

A robot controller for controlling a robotic device within a robot cell including multiple robotic devices is provided. The controller is configured to wirelessly receive first control data comprising cell state data indicative of a current state of the robot cell. The first control data are received via one of a broadcast and a multicast transmission directed to the multiple robotic devices in the robot cell. The controller is configured to wirelessly receive second control data comprising one or more control commands for at least the robotic device. The controller is configured to selectively control the robotic device based on the first control data or the second control data.

16 Claims, 6 Drawing Sheets

(52) U.S. Cl.
CPC .................. *G05B 19/41815* (2013.01); *G05B 2219/31076* (2013.01); *G05B 2219/31087* (2013.01)

(56) References Cited

U.S. PATENT DOCUMENTS

| | | | | |
|---|---|---|---|---|
| 9,751,211 | B1 | 9/2017 | Saunders et al. | |
| 10,491,290 | B2 | 11/2019 | Takaoki | |
| 2002/0168937 | A1 | 11/2002 | Clark et al. | |
| 2007/0010898 | A1* | 1/2007 | Hosek | G05B 19/4148 700/2 |
| 2015/0336269 | A1* | 11/2015 | Linnell | B25J 9/1656 700/245 |
| 2017/0265167 | A1* | 9/2017 | Guo | H04W 72/30 |
| 2017/0308052 | A1 | 10/2017 | Kajiyama | |
| 2018/0034652 | A1 | 2/2018 | Okazaki et al. | |
| 2018/0326593 | A1* | 11/2018 | Yoshiuchi | B25J 9/162 |
| 2019/0061166 | A1* | 2/2019 | Dai | B25J 19/005 |
| 2020/0223062 | A1* | 7/2020 | Fujimori | B25J 13/08 |

* cited by examiner

TECHNIQUE FOR WIRELESSLY CONTROLLING A ROBOTIC DEVICE

CROSS REFERENCE TO RELATED APPLICATION(S)

This application is a 35 U.S.C. § 371 National Phase Entry Application from PCT/EP2018/064624, filed Jun. 4, 2018, designating the United States, the disclosure of which is incorporated herein by reference in its entirety.

TECHNICAL FIELD

The present disclosure generally relates to industrial automation. In particular, a technique for wirelessly controlling a robotic device in a robot cell including multiple robotic devices is presented. The technique may be implemented in the form of devices, methods, systems, computer program products and computing clouds.

BACKGROUND

In industrial automation, there is a trend to build robot cells from multiple robotic devices (such as collaborative robot arms) and to control these robotic devices remotely. Existing safety mechanisms, on the other hand, have been developed for local control where the cell controller is locally placed into the robot cell. These safety mechanisms assume that the communication between the robotic devices and their controller is reliable and has no delay. This assumption is valid when field buses (e.g., EtherCAT or ProfiNet) are used to connect the robotic devices with the controller. The underlying industrial computer network protocols are thus developed for real-time distributed control.

One of the most challenging issues in industrial automation is to fulfil the existing reliability and safety requirements when some control functionalities are remotely deployed in a computing cloud and connected to the robot cell over a wireless connection. A central goal of safety mechanisms in any robot cell is to avoid collision among the robotic devices included therein and to react properly to unforeseen situations. This goal is challenging to fulfil when cell control takes place via a wireless connection as control commands can be delayed or lost, which can result in an unsafe situation.

Existing safety mechanisms stop the robot cell when an unwanted or an unsafe situation is detected (e.g., a person enters the robot cell). As a further example, a robot arm may detect a collision with an external object and stop automatically (protective stop). Such safety mechanism cannot be directly used when a robot cell is controlled from a cloud-based controller over a wireless connection.

The reason is that the characteristics of field buses and wireless connections are different. In general, field buses provide more deterministic behaviour. Field buses use wire-based transmission, and therefore they are not impacted by the uncertainties of wireless transmission.

To provide the desired safety levels for robot cells that are controlled remotely via a wireless connection, the robot cell has to have the ability to autonomously perform local safety actions when there is a problem with the remote controller. To perform a safety action by a local robotic device, the device needs information about the state of other devices to avoid further unsafe situations (e.g., a collision with them). This state information is particularly critical when several robotic devices (e.g., several robot arms) work on the same task.

Current cloud-based solutions use a central gateway in the robot cell to guarantee that all robotic devices have the state information. In these gateway-based solutions, all robotic devices of the robot cell are connected to the local gateway.

SUMMARY

There is a need for a technique for wirelessly controlling a robotic device within a robot cell including multiple robotic devices, wherein the technique can efficiently be implemented and guarantees high standards in regard to a reliability and safety.

According to a first aspect, a robot controller for controlling a robotic device within a robot cell including multiple robotic devices is presented. The controller is configured to wirelessly receive first control data comprising cell state data indicative of a current state of the robot cell, wherein the first control data are received via one of a broadcast and a multicast transmission directed to the multiple robotic devices in the robot cell.

In certain variants of the present disclosure, a central gateway in the robot cell may be omitted. Rather, the multiple robotic devices within the robot cell may directly receive all required information, such as the first or any further control data, from a wireless access network without any proxy. The wireless access network may be a cellular or non-cellular network.

The robotic device may be a robot actuator (such as a robot arm), an automated guided vehicle, and so on. Each robotic device may comprise multiple individually controllable entities (such as multiple electric motors). The robot controller of a particular robotic device may be configured to receive a specific control command (e.g., via a wireless unicast transmission). It may further be configured to control multiple individually controllable entities of the robotic device to execute the control command (e.g., to move a robot arm within multiple degrees of freedom based on that control command).

In some variants, two or more of the multiple robotic devices in the robot cell may be configured to wirelessly receive the first and/or any other control data. The first and/or any other control data may be received substantially simultaneously in view of the broadcast or multicast transmission mode used to send same to the multiple robotic devices. To this end, each of these robotic devices may comprise a wireless receiver and, optionally, a wireless transmitter with a direct connection to a wireless access network.

The multiple robotic devices within the robot cell may form a multicast group. In case multiple robot cells are controlled via the same wireless access network, the robotic devices in different robot cells may constitute different multicast groups. In case only a single robot cell is controlled via a dedicated wireless access network, a broadcast channel may be used to wirelessly transmit the first and/or any further control data to the robotic devices in that robot cell. The multiple robotic devices within the robot cell may collaboratively work on a work object.

The state data may include sensory data pertaining to the robot cell. The sensory data may have been generated by one or more sensors located in the robot cell. Such sensors may include cameras, image sensors, position sensors, orientation sensors, and so on.

The robot controller may further be configured to wirelessly receive second control data comprising one or more control commands for at least the robotic device, and to selectively control the robotic device based on the first control data or the second control data. The second control data may be received via a unicast transmission directed to the robotic device controlled by the robot controller. Alternatively, the second control data may be received via one of a broadcast and a multicast transmission directed to the multiple robotic devices in the robot cell, as explained above.

The robot controller may further be configured to control the robotic device based on the first control data in case second control data are unavailable or not usable. The second control data may be unavailable because of at least one of

- a wireless transmission failure;
- a failure in a computing cloud-based robot cell controller generating at least the second and, optionally, the first control data;
- a failure of a computing cloud hosting a robot cell controller generating at least the second and, optionally, the first control data; and
- an event in the robot cell that requires an immediate control intervention.

The robot controller may further be configured to control the robotic device based on the first control data to at least temporarily continue movement along a planned movement path. In this regard, the robot controller may further be configured to evaluate the cell state data to determine if it is safe to continue movement along the planned movement path (or if, for example, a collision may occur when the movement is continued).

The first control data may further comprise path data indicative of planned movement paths of the multiple robotic devices in the robot cell. The path data include at least one of position, time and speed information in regard to the planned movement paths.

The robot controller may further be configured to receive the path data in one or more first messages and to receive the cell state data in one or more second messages different from the one or more first messages. The robot controller may specifically be configured to receive the second control data in one or more third messages different from at least one of the one or more first messages and the one or more second messages.

According to a second aspect, a computing cloud-based controller for a robot cell comprising multiple robotic devices is provided. The controller is configured to obtain first control data comprising cell state data indicative of a current state of the robot cell, and to forward the first control data to a wireless transmitter for a wireless transmission via one of broadcast and multicast directed to the multiple robotic devices in the robot cell.

In some variants, the controller may be configured to explicitly instruct the wireless transmitter, such as a radio base station or an access point in a radio access network, to switch into a unicast or multicast transmission mode for sending the first and/or any other control data to the multiple robotic devices. The controller may further be figured to select a unicast transmission mode for transmission of the second control data discussed above.

The computing cloud-based controller may obtain the cell state data from sensory data pertaining to the robot cell and received from the robot cell.

The computing cloud-based controller may further be configured to control the wireless transmitter to perform no re-transmissions. This control may entail instructing the wireless transmitter to use a multicast or broadcast mode, as in such modes no re-transmission functionality may be provided. As an example, the multicast or broadcast transmission protocol used by the wireless transmitter may not comprise any Hybrid Automatic Repeat Request (HARQ) or similar functionality. By avoiding re-transmissions, it can for example be ensured that all robotic devices within a robot cell simultaneously receive the first and/or any other control data because the delay introduced by a re-transmission can be avoided.

The first control data may further comprise path data indicative of planned movement paths of the multiple robotic devices in the robot cell. In this case, the computing cloud-based controller may further be configured to control the wireless transmitter to transmit the path data in one or more first messages and to transmit the cell state data in one or more second messages different from the first messages. As an example, the computing cloud-based controller may be configured to control the wireless transmitter to transmit the one or more first messages less often than the one or more second messages. The computing cloud-based controller may also be configured to detect a change of a predicted movement path and to control the wireless transmitter to transmit one or more first messages indicative of the change of the predicted movement path. Still further, the computing cloud-based controller may be configured to control the wireless transmitter to transmit second control data in one or more third messages different from at least one of the one or more first messages and the one or more second messages, wherein the second control data comprise one or more control commands for at least the robotic device.

The path data may be obtained by path calculation based on evaluation of one or more control commands. Alternatively, or in addition the path data may be obtained by temporal extrapolation of sensory data received from the robot cell.

Also provided is a robot cell system comprising multiple robot controllers as presented herein and, optionally, a robot cell controller as presented herein.

According to a further aspect, a method of controlling a robotic device within a robot cell including multiple robotic devices is provided. The method comprises wirelessly receiving first control data comprising cell state data indicative of a current state of the robot cell, wherein the first control data are received via one of a broadcast and a multicast transmission directed to the multiple robotic devices in the robot cell. The method may be performed by the robot controller presented herein.

According to a still further aspect, a method for controlling a robot cell comprising multiple robotic devices is presented. The method comprises obtaining first control data comprising cell state data indicative of a current state of the robot cell, and forwarding the first control data to a wireless transmitter for a wireless transmission via one of broadcast or multicast directed to the multiple robotic devices in the robot cell. The method may be performed by the computer cloud-based robot cell controller presented herein.

Also provided is a computer program product comprising program code portions for performing the steps of any of the method aspects presented herein when executed by one or more processors. The computer program product may be stored a computer-readable recording medium. The computer program product may also be provided for download via a network connection.

Also presented is a cloud computing system configured to perform any of the method aspects presented herein in regard to the cloud-based robot cell controller. The cloud computing system may comprise distributed cloud computing resources that jointly perform the method aspects presented herein.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
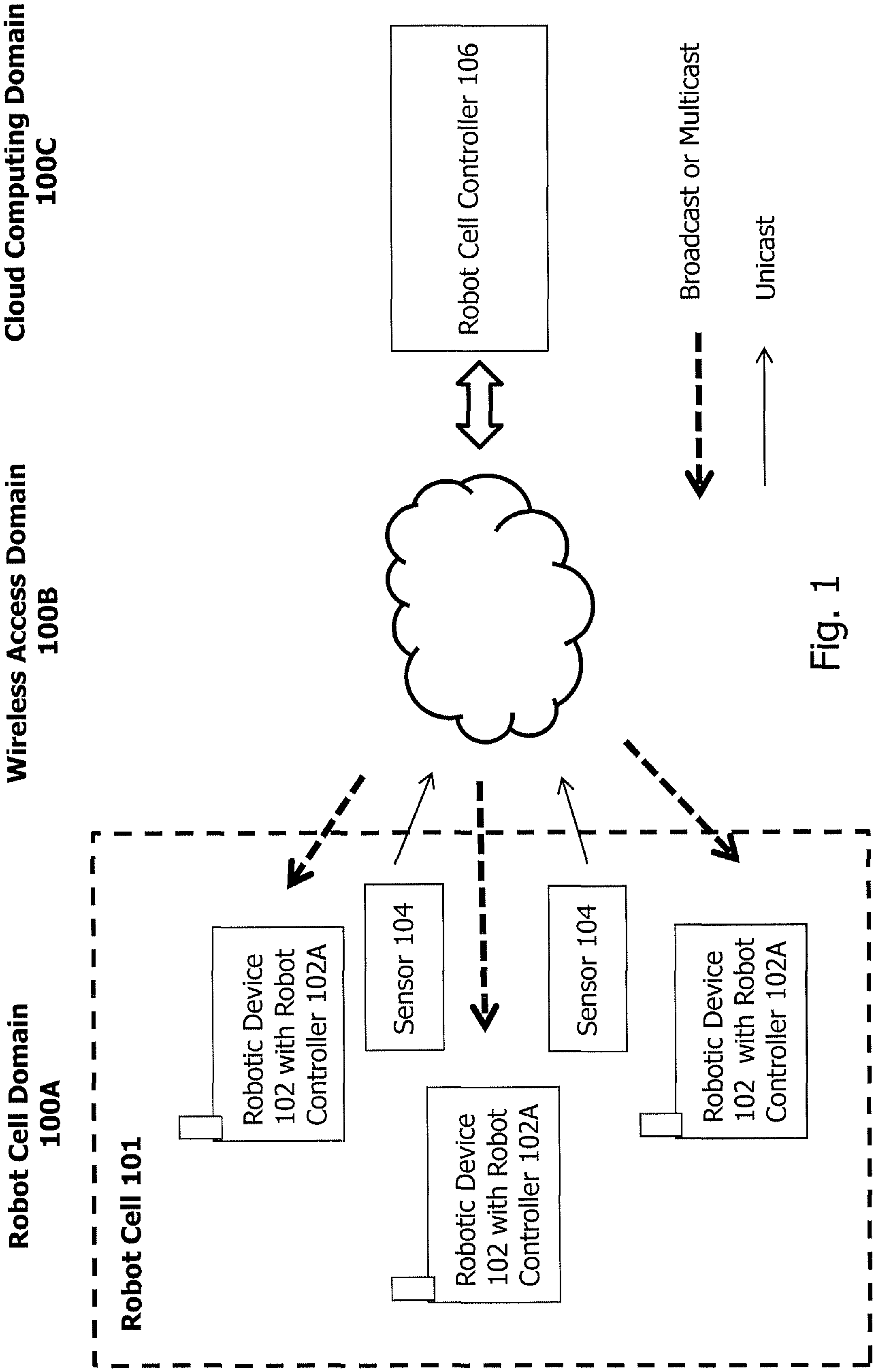
FIG. 1 illustrates a network system embodiment of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on specific radio access network types such as 5$^{th}$ Generation (5G) networks, the present disclosure can also be implemented in connection with other radio access network types. Moreover, while certain aspects in the following description will exemplarily be described in connection with cellular networks, particularly as standardized by 3GPP, the present disclosure is not restricted to any specific wireless access type.

Those skilled in the art will further appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 illustrates an embodiment a network system 100 implementing a computing cloud-based robot cell control. As shown in FIG. 1, the network system 100 comprises a robot cell domain 100A, a wireless access domain 100B as well as a cloud computing domain 100C.

The robot cell domain 100A comprises at least one robot cell 101 with multiple robotic devices 102 each having a dedicated robot controller 102A. The robotic devices 102 can be various actuators such as robot arms movable within various degrees of freedom. The various robotic devices 102 within the robot cell 101 may collaboratively work on the same task (e.g., on the same work product).

The robot cell domain 100A further comprises multiple sensors 104 such as cameras, position sensors and so on. The sensors 104 can be freely distributed in the robot cell 101. One or more of the sensors 104 can also be integrated into one or more of the robotic devices 102. In such a case the robot controller 102A of a particular robot device 102 may be configured to operate on the basis of a signal received from a corresponding sensor 104 integrated into that robotic device 102.

The wireless access domain 100B may be a cellular or non-cellular network, such as a cellular network specified by the 3$^{rd}$ Generation Partnership Project (3GPP). In some implementations, the wireless access domain 100B may be compliant with the 3GPP standards according to Release R15. The wireless access domain 100B may comprise a base station or a wireless access point that enables a wireless communication between components of the robot cell 101 on the one hand and the cloud computing domain 100C on the other.

As illustrated in FIG. 1, the robotic devices 102 with their associated robot controllers 102A are configured to receive broadcast or multicast transmissions from the wireless access domain 100B. These broadcast and multicast transmission are used to distribute control data comprising cell state data indicative of a current state of the robot cell 101. Such cell state data may have been acquired by one or more of the sensors 104 and communicated via the wireless access domain 100B to the cloud computing domain 100C (e.g., via unicast transmissions, see FIG. 1).

The cloud computing domain 100C comprises a robot cell controller 106 composed of could computing resources. The robot cell controller 106 is configured to receive the cell state data as sensory data from the sensors 104 via the wireless access domain 100B. The robot cell controller 106 is further configured to process these cell state data and to forward the processed cell state data as control data to the wireless access domain 100B for distribution via broadcast or multicast to the individual robotic devices 102 with their associated robot controllers 102A.

Figure 2:
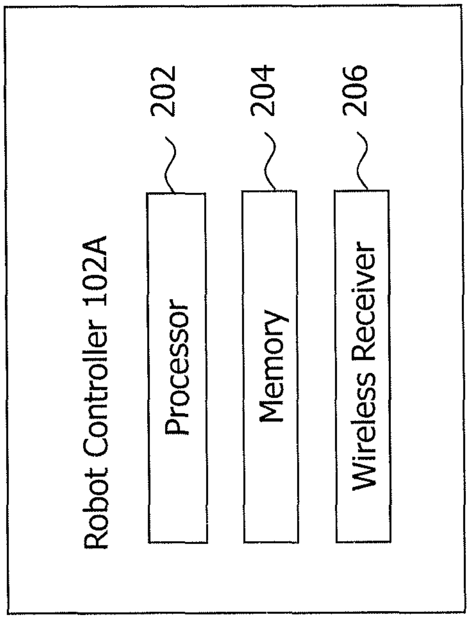
FIGS. 2 & 3 illustrate embodiments of a robot controller for a robotic device according to the present disclosure.
Figure 3:
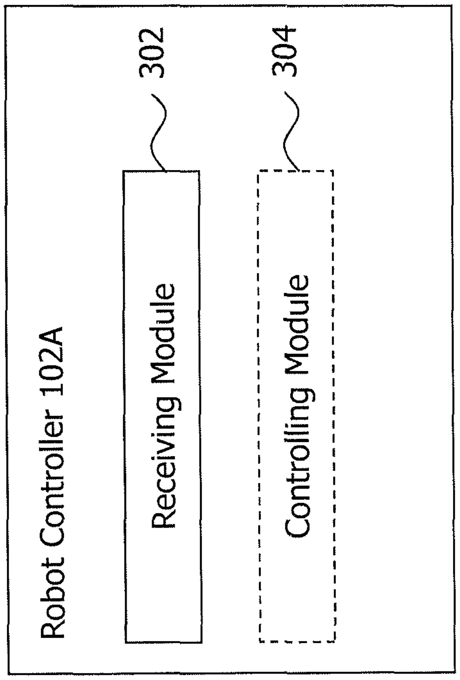

FIGS. 2 and 3 illustrate two embodiments of the robot controller 102A as provided for each of the robotic devices 102 in FIG. 1. In the embodiment illustrated in FIG. 2, the robot controller 102A comprises a processor 202 and a memory 204 coupled to the processor 202. Further, the robot controller 102A comprises a wireless receiver 206 for communication with the wireless access domain 100B.

The robot controller 102A of FIG. 2 is configured to wirelessly receive, via the wireless receiver 206, control data generated within the cloud computing domain 100C and forwarded to the robot control 102A via the wireless access domain 100B. As mentioned above, these control data comprise cell state data indicative of a current state of the robot cell 101 as detected by the one or more sensors 104 (see FIG. 1). The control data are received from the wireless access domain 100B via one of a broadcast and a multicast transmission simultaneously directed to two or more of the robotic devices 102 within the robot cell 101 (see FIG. 1).

The processor 202 is configured to process the control data received via the wireless receiver 206 as will be explained in greater detail below. The corresponding operations are performed by the processor 202 under control of program code stored in the memory 204.

FIG. 3 shows an embodiment in which the robot controller 102A is implemented in a modular configuration. As shown in FIG. 3, the robot controller 102A comprises a receiving module 302 configured to wirelessly receive control data comprising cell state data indicative of a current state of the robot cell 101, as explained above. The control data are received via one of a broadcast and a multicast transmission directed to the multiple robotic devices 102 in the robot cell 101. The robot controller 102A in the modular implementation of FIG. 3 optionally comprises a controlling module 304 configured to control the associated robotic device 102 based on the cell state data received by the receiving module 302.

Figure 4:
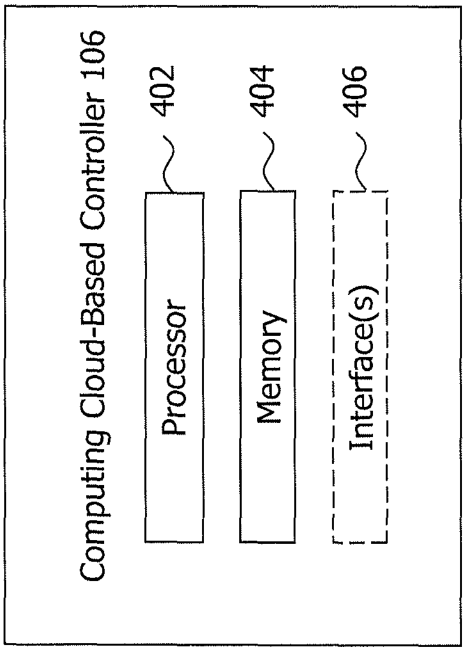
FIGS. 4 & 5 illustrate embodiments of a cloud-based robot cell controller according to the present disclosure.
Figure 5:
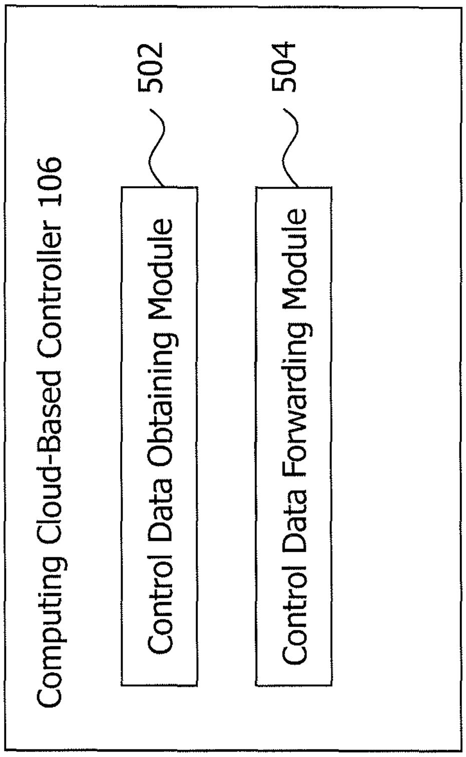

FIGS. 4 and 5 illustrate two embodiments of the computing cloud-based robot cell controller 106 of FIG. 1. In the embodiment illustrated in FIG. 4, the cloud-based robot cell controller 106 comprises a processor 402 and a memory 404 coupled to the processor. Optionally, the cloud-base controller 106 further comprises one or more interfaces 406 for communication with other components of the network system 100 of FIG. 1, in particular with the wireless access domain 100B.

The processor 402 is configured to obtain control data comprising cell state data indicative of a current state of the robot cell 101. As has been explained in the context of FIG. 1, such cell state data is collected by the sensors 104 within the robot cell 101.

The processor 402 is further configured to forward, for example via the one or more interfaces 406, the corresponding control data to a wireless transmitter within the wireless access domain 100B for a wireless unicast or multicast transmission directed to the multiple robotic devices 102 in the robot cell 101. In this regard, the processor 202 may specifically instruct a wireless transmitter within the wireless access domain 100B to use a multicast or broadcast transmission mode. The processor 402 may also be configured to request the wireless transmitter to use a unicast transmission mode for transmitting other control data, in particular control commands directed to individual ones of the robotic devices 102 within the robot cell 101 (see FIG. 1).

FIG. 5 shows an embodiment in which the computing cloud-based robot cell controller 106 is implemented in a modular configuration. As shown in FIG. 5, the controller 106 comprises a control data obtaining a module 502 configured to obtain control data comprising cell state data indicative of the current state of the robot cell 101, as explained above. The controller 106 further comprises a control data forwarding module 504 configured to forward the control data to a wireless transmitter within the wireless access domain 100B for a wireless broadcast or multicast transmission thereof towards the multiple robotic devices 102 in the robot cell 101.

Figure 6:
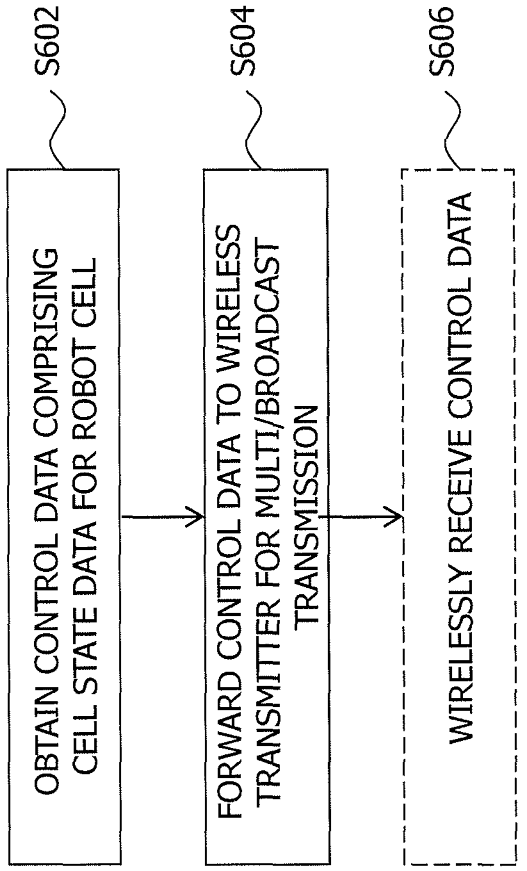
FIG. 6 illustrates a method embodiment of the present disclosure.

FIG. 6 illustrates in a flow diagram 600 a method embodiment jointly performed by the cloud-based robot cell controller 106 and one or more of the robot controllers 102A discussed above with reference to FIGS. 1 to 5. The steps in the boxes with continuous lines are performed by the robot cell controller 106, and the step in the box with dashed lines is performed by one or more of the robot controllers 102A.

The method starts in step S602 with the robot cell controller 106 obtaining control data comprising cell state data for the robot cell 101. The cell state data include sensory data pertaining to the robot cell 101 as acquired by one or more of the sensors 104.

In a further step S604, the robot cell controller 106 forwards the control data obtained in step S602 to a wireless transmitter within the wireless access domain 100B for a multicast or broadcast transmission directed to the robotic devices 102 within the robot cell 101. A broadcast transmission may be used if the wireless access domain 100B is in charge of only a single robot cell 101, so that the wireless transmission will be received by all robotic devices 102 reachable via the wireless access domain 100B. On the other hand, if the wireless access domain 100B is in charge of multiple independent robot cells 101, a multicast transmission mode may be used to make sure that a specific wireless transmission is only received by the specific robotic devices 102 of a particular robot cell 101. These specific robotic devices 102 will thus form multicast group. It will be appreciated that multicast and broadcast transmission modes are available in the context of many different radio access technologies, including 4G and 5G networks.

As indicated in step S606, the control data wirelessly transmitted from the wireless access domain 100B via the multicast or broadcast transmission will be received by the various robot controllers 102A of the robotic devices 102 within the robot cell 101. The robot controllers 102A may also receive further control data in the form of dedicated control commands via the wireless access domain 100B from the cloud computing domain 100C. Such control commands may be received via a unicast transmission directed to an individual robotic device 102. An individual robot controller 102A may thus be configured to selectively control the associated robotic device 102 based on the cell state data or the one or more control commands. In one variant, the robot controller 102A controls the associated robotic device 102 based on the one or more control commands and only switches to a control based on the cell state data and, optionally, further data, in case control commands are unavailable or not usable (e.g., because of a technical problem within the cloud computing domain 100C).

As such, the robotic devices 102 can switch to autonomous operation based on the cell state data when control commands are not available. It will, therefore, not be necessary to immediately stop the robotic devices 102 because a sudden event in the robot cell 101 requires an immediate control intervention for which no control command can be expected to be received in view of the delays associated with a wireless communication scenario.

By broadcasting or multicasting the cell state data to the robotic devices 102, it can be ensured that all the robotic devices 102 within the cell 101 receive the corresponding data simultaneously and can react in a coordinated manner. Moreover, broadcast and unicast transition modes typically do not provide any re-transmissions (e.g., based on HARQ), which is advantageous since such re-transmissions would again distort a simultaneous reception of the cell state data.

In the following, a further embodiment of a network system 100 will be described with reference to FIG. 7. As explained above, the same reference numerals as in FIG. 1 will denote the same or similar components.

Figure 7:
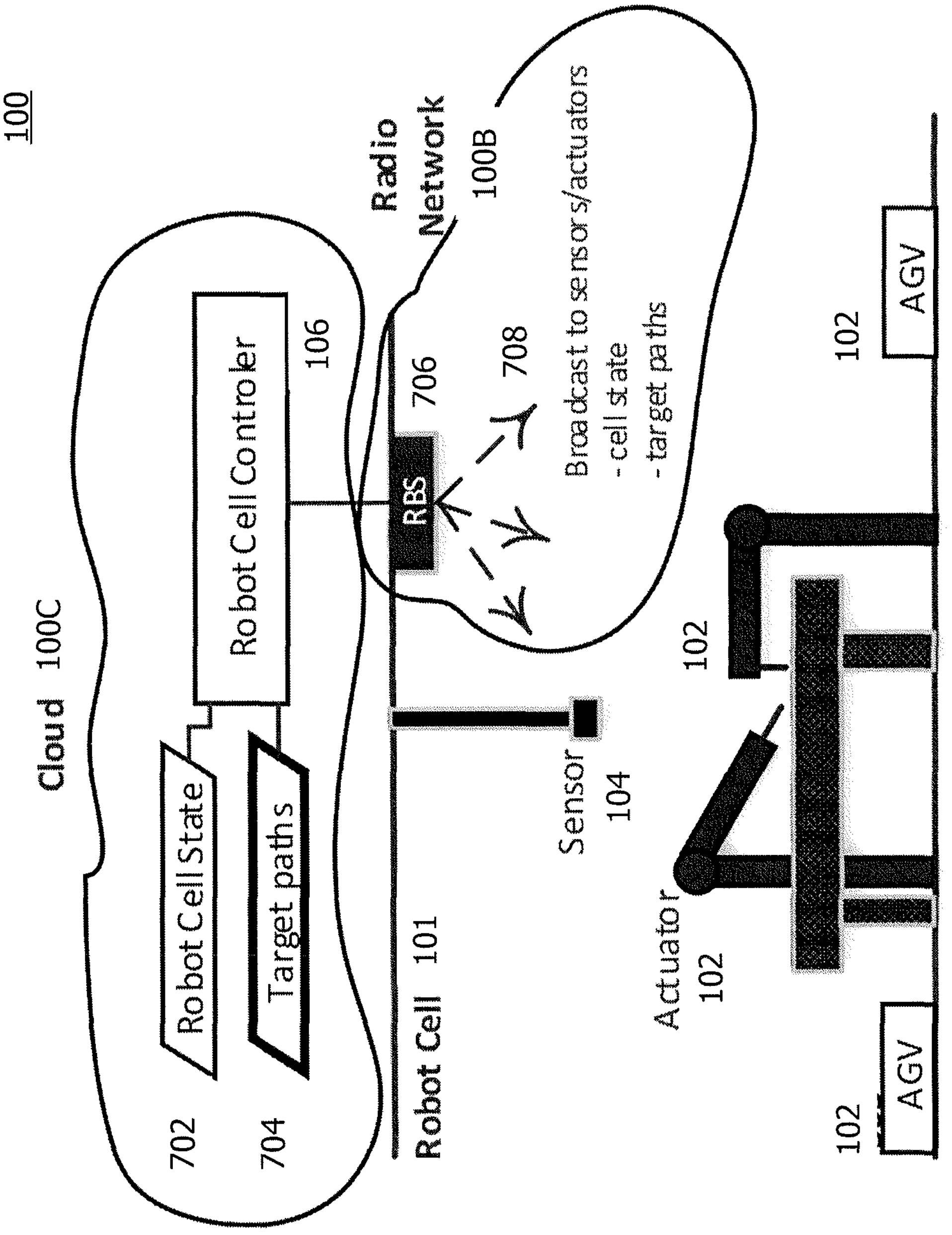
FIG. 7 illustrates a further network system embodiments of the present disclosure.

As shown in FIG. 7, the robot cell 101 comprises one or more sensors 104 (such as a centrally mounted camera supervising the robot cell 101) and a multiple robotic devices 102 (such as actuators and automated guided vehicles, AGV). Each of these robotic devices 102 will include a robot controller as explained above (see, e.g., reference numeral 102A in FIGS. 1, 2, and 3).

The robot cell 101 is controlled by a robot cell controller 106 deployed in a computing cloud domain 100C and connected to the robot cell 101 via a radio network domain 100B. To coordinate the various operational tasks within the robot cell 101, a state of the robot cell 101 is maintained in the computing cloud 100C in the form of cell state data 702. As explained above, these cell state data 702 originate from sensory data of the one or more sensors 104 in the robot cell 101. The cell state data 702 are forwarded by the robot cell controller 106 to a radio base station 706 of the radio network 100B and distributed via broadcast or multicast messages towards the robotic devices 102 and their associated robot controllers 102A.

As illustrated in FIG. 7, target path data 704 are also maintained within the cloud computing domain 100C. These target path data 704 are indicative of movement paths of the robotic devices 102 within the robot cell 101. The target path data 704 include one or more of position, time and speed information in regard to the planned movement paths.

The path data 704 may be obtained within the cloud computing domain 100C by path calculation based on an evaluation of one or more control commands previously sent or about to be sent to the individual robotic devices 102. Alternatively, or in addition, the path data 704 may be obtained by temporal extrapolation of sensory data (e.g., video data) acquired by the one or more sensors 104 within the robot cell 101.

The target path data 704 are likewise forwarded by the robot cell controller 106 to the radio base station 706 for a multicast or broadcast transmission to the robotic devices 102. Since the cell state data typically change more frequently than the target path data 704, the cell state data 702 and the target path data 704 may be transmitted in separate messages to the robotic devices 102. For example, the cell state data 702 may be transmitted at a higher frequency or more often than the target path data 704. The target path data 704 may in particular be transmitted in case the robot cell controller 106 detects a change of a predicted movement path (e.g., based on information received from sensor 104 within the robot cell 101).

Once such a change of the predicted movement path is detected, the robot cell controller 106 controls the transmission of updated target path data 704 towards the robot cell 101 so as to inform the robotic devices 102 of the change of the predicted movement path. Based on the updated target path data 704, the robotic devices 102 can locally initiate individual actions to avoid unsafe operating situations or to optimize their operation locally.

In the following, the operation of the network system 100 illustrated in FIG. 7 will be described in more detail with reference to FIG. 8 and the flow diagram 800 shown therein.

Figure 8:
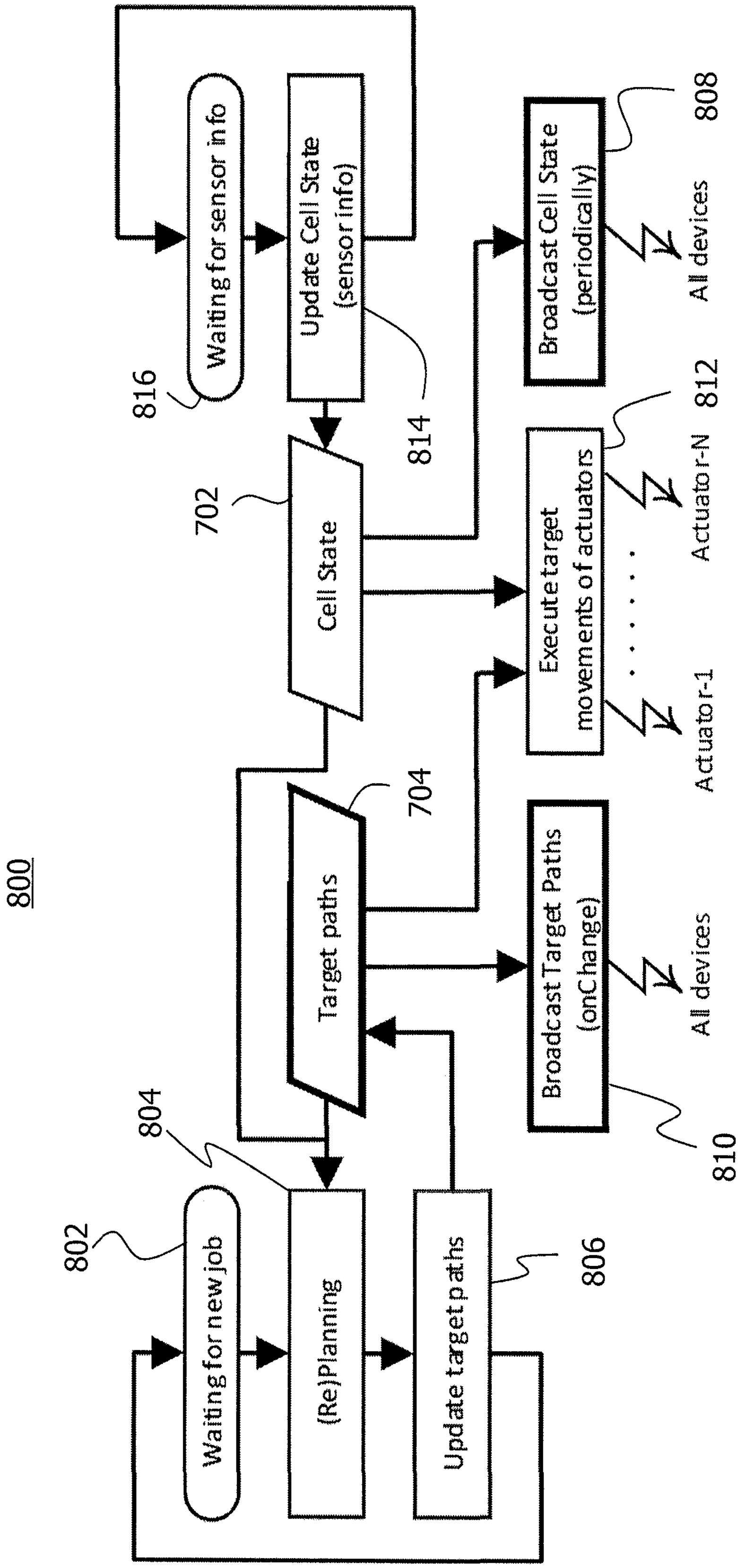
FIG. 8 illustrates a further method embodiment of the present disclosure.

As illustrated in FIG. 8, the robot cell controller 106 initially waits for a new control job in step 802. Once a new job has been received in step 802, the planning of one or more movements of one or more of the robotic devices 102 within the robot cell 101 is performed in step 804, and also associated control commands may be generated in this context. In step 804, for example, a path (also called trajectory) calculation can be performed for an individual robotic device 102 such as a robot arm based on the current robot cell state data 702. The target path data 704 can be updated accordingly (step 806). Also the cell state data 702 are regularly updated by the robot cell controller 106 based on sensory feedback from the robot cell 101 (see steps 814 and 816). When some unplanned or unforeseen event occurs in the robot cell 101 (as detected, for example in step 808 based on sensory information received in step 816), then the calculated path will again be updated in step 806. The unplanned event can be a person or object entering the robot cell 101, so that collision avoidance needs to be initiated.

Both the cell state data 702 and the target path data 704 are wirelessly transmitted directly to the robotic devices 102. Accordingly, in step 808, the cell state data can be broadcasted by the wireless access domain 100B to the cell robot 101. On the other hand, in step 810, the target path data 704 are wirelessly broadcasted via the wireless access domain 100B to the robot cell 101 only when a target path has been updated in step 806. As explained above, an advantage of the broadcast transmissions in steps 808 and 810 is the fact that all the robotic devices 102 will receive the same information at the same time.

Based on the target path data 704 and the cell state data 702, the robot cell control 106 may also generate control commands that are transmitted via unicast in step 812 to individual ones of the concerned robotic devices 102.

The cell state data 702 may be transmitted in step 808 more frequently than the target path data 704 in step 810. The cell state data 702 may be transmitted at a frequency of less than one second (e.g., every 10 ms). An individual cell state message may be indicative of the current state or position of a robotic device 102 (e.g., the current position of a particular robot arm in Cartesian coordinates). Alternatively, or in addition, the cell state data 702 may comprise video information as received from a camera sensor 104. As an option, the cell state data message may also include the current or latest control command sent to each of the various robotic devices 102.

A target path message is mainly sent upon a target path change, as explained above. To support newly attached robotic devices 102, the target path data 704 may also be sent periodically, but less frequently than the cell state data 702 (e.g., every second or at intervals of multiple seconds). As explained above, the target path data 704 contain the target information regarding the target paths of the robotic devices 102 and the corresponding time information (e.g., a particular robot arm moves to point (X,Y,Z) through a straight path and will be thereafter 12 seconds).

An exemplary format of a cell state message is defined as follows:

<device-id> <posCartesian>, such as "arm-1; 0.2 m 1.3 m 4.2 m" or "agv-1; 1.3 m 0.5 m"

Exemplary formats of a target path message could look as follows:

<device-id> <time-posCartesian> <time-posCartesian> . . .

This message describes the movement of a device in Cartesian space and in time, such as "arm-1; 0.1 sec 0.2 m 1.3 m 4.2 m; 0.2 sec 0.3 m 1.3 m 4.2 m; 1 sec 0.4 m 1.3 m 4.2 m".

<device-id> <time-endPosCartesian> <status>

This message describes the end point of a path where the device will be stopped, such as "arm-1; 12 sec 0.8 m 1.3 m 4.2 m; stop".

The robotic devices 102 may switch to an autonomous mode of operation and use the received cells state data 702 and target path data 704 to perform certain actions when some broadcast or multicast frames or the dedicated unicast transmissions (with control commands) are not received in time. When to switch to an autonomous mode depends on the robotic device 102 and its functionality. For example, a camera-based robot controller 102A (e.g., a robot controller 102A with access to a local camera-based sensor 104) may evaluate the received cell state data 704 to be able to calculate if an associated robotic device 102 in the form of a controlled robot arm will collide with a person or other object that entered the robot cell 101. If a collision will happen, then the robot arm should be stopped, otherwise its operation can continue.

As has become apparent from the above description of exemplary embodiments, the technique proposed herein increases safety in regard to a robot cell and additionally increases its efficiency by enabling autonomous actions to handle unexpected situations, rather than simply stopping the complete robot cell 101. Moreover, wireless resource usage can be optimized when using a multicast or broadcast transmission mode. Such transmission modes are readily available in many radio access technologies to address a predefined set of recipients and/or recipients in a predefined region. Additionally, in at least some implementations no central gateway will be required for robot cell control, which renders robot cell control more efficient and, in particular, more flexible as new robotic devices are dynamically attached.

The invention claimed is:

1. A robot controller for controlling a robotic device within a robot cell including multiple robotic devices, the controller being configured to:

wirelessly receive first control data comprising cell state data indicative of a current state of the robot cell, wherein the same first control data are received by the multiple robotic devices in the robot cell at the same time via a broadcast transmission directed to the multiple robotic devices in the robot cell, and the first control data further comprise path data indicative of planned movement paths of the multiple robotic devices in the robot cell;

wirelessly receive second control data comprising one or more control commands for at least the robotic device;

determine whether the second control data is unavailable or not useable; and based on the determination, selectively control the robotic device based on the first control data or the second control data;

wherein when to:

determine whether the second control data is unavailable or not useable, and selectively control the robotic device based on the first control data or the second control data comprises to control the robotic device based on the first control data when determining the second control data is unavailable or not useable.

2. The robot controller of claim 1, wherein the second control data are received via a unicast transmission directed to the robotic device controlled by the robot controller or wherein the second control data are received via one of a broadcast and a multicast transmission directed to the multiple robotic devices in the robot cell.

3. The robot controller of claim 1, wherein the second control data are unavailable because of at least one of:

a wireless transmission failure;

a failure in a computing cloud-based robot cell controller generating at least the second control data;

a failure of a computing cloud hosting a robot cell controller generating at least the second control data; and an event in the robot cell that requires an immediate control intervention.

4. The robot controller of claim 1, further configured to:

control the robotic device based on the first control data to at least temporarily continue movement along a planned movement path.

5. The robot controller of claim 4, further configured to:

evaluate the cell state data to determine if it is safe to continue movement along the planned movement path.

6. The robot controller of claim 1, wherein the path data include at least one of position, time, and speed information in regard to the planned movement paths.

7. The robot controller of claim 1, further configured to:

receive the path data in one or more first messages and to receive the cell state data in one or more second messages different from the one or more first messages.

8. The robot controller of claim 7, further configured to:

receive the second control data in one more third messages different from at least one of the one or more first messages and the one or more second messages.

9. A computing cloud-based controller for a robot cell comprising multiple robotic devices, the controller being configured to:

obtain first control data comprising cell state data indicative of a current state of the robot cell, wherein the first control data further comprise path data indicative of planned movement paths of the multiple robotic devices in the robot cell;

forward the first control data to a wireless transmitter for a transmission via a broadcast transmission directed to the multiple robotic devices in the robot cell, wherein the same first control data are transmitted to and received by the multiple robotic devices in the robot cell at the same time;

control the wireless transmitter to transmit the path data in one or more first messages and to transmit the cell state data in one or more second messages different from the first messages; and control the wireless transmitter to transmit the one or more first messages less often than the one or more second messages.

10. The computing cloud-based controller of claim 9, wherein the cell state data are obtained from sensory data pertaining to the robot cell and received from the robot cell.

11. The computing cloud-based controller of claim 9, further configured to control the wireless transmitter to perform no re-transmissions.

12. The computing cloud-based controller of claim 9, further configured to:

detect a change of a predicted movement path; and control the wireless transmitter to transmit one or more first messages indicative of the change of the predicted movement path.

13. The computing cloud-based controller of claim 9, further configured to:

control the wireless transmitter to transmit second control data in one or more third messages different from at least one of the one or more first messages and the one or more second messages, wherein the second control data comprise one or more control commands for at least the robotic device.

14. The computing cloud-based controller of claim 9, wherein the path data are obtained by at least one of:

path calculation based on evaluation of one or more control commands; and temporal extrapolation of sensory data received from the robot cell.

15. A method of controlling a robotic device within a robot cell including multiple robotic devices, the method comprising:

wirelessly receiving first control data comprising cell state data indicative of a current state of the robot cell, wherein the same first control data are received by the multiple robotic devices in the robot cell at the same time via a broadcast transmission directed to the multiple robotic devices in the robot cell, and the first control data further comprise path data indicative of planned movement paths of the multiple robotic devices in the robot cell;

wirelessly receiving second control data comprising one or more control commands for at least the robotic device;

determining whether the second control data is unavailable or not useable; and based on the determination, selectively controlling the robotic device based on the first control data or the second control data, wherein when determining whether the second control data is unavailable or not useable and selectively controlling the robotic device based on the first control data or the second control data comprises controlling the robotic device based on the first control data when determining the second control data is unavailable or not useable.

16. A method for controlling a robot cell comprising multiple robotic devices, the method comprising:

obtaining first control data comprising cell state data indicative of a current state of the robot cell, wherein the first control data comprise path data indicative of planned movement paths of the multiple robotic devices in the robot cell;

forwarding the first control data to a wireless transmitter for a wireless transmission via a broadcast transmission directed to the multiple robotic devices in the robot cell, wherein the same first control data are transmitted to and received by the multiple robotic devices in the robot cell at the same time;

controlling the wireless transmitter to transmit the path data in one or more first messages and to transmit the cell state data in one or more second messages different from the first messages; and controlling the wireless transmitter to transmit the one or more first messages less often than the one or more second messages.

* * * * *